US010190367B2

(12) United States Patent
Barnhouse et al.

(10) Patent No.: US 10,190,367 B2
(45) Date of Patent: Jan. 29, 2019

(54) SPLINE INSERT FOR A DOWNHOLE TOOL

(71) Applicant: Schlumberger Technology Corporation, Sugar Land, TX (US)

(72) Inventors: James A. Barnhouse, Houston, TX (US); Manoj D. Mahajan, Houston, TX (US); Vincente S. Salvo, Lubbock, TX (US); Timothy A. Burdett, Houston, TX (US); Yuri Y. Burhan, Spring, TX (US); Kenneth D. Hora, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 531 days.

(21) Appl. No.: 14/797,341

(22) Filed: Jul. 13, 2015

(65) Prior Publication Data
US 2016/0017664 A1 Jan. 21, 2016

Related U.S. Application Data

(60) Provisional application No. 62/024,678, filed on Jul. 15, 2014.

(51) Int. Cl.
*E21B 10/32* (2006.01)
*B23P 15/46* (2006.01)

(52) U.S. Cl.
CPC .............. *E21B 10/32* (2013.01); *B23P 15/46* (2013.01)

(58) Field of Classification Search
CPC .................................. E21B 10/32; E21B 10/322
See application file for complete search history.

(56) References Cited

U.S. PATENT DOCUMENTS

| 4,277,869 | A | * | 7/1981 | Hartwell ............... B23P 15/00 166/173 |
| 6,732,817 | B2 | | 5/2004 | Dewey et al. |
| 7,314,099 | B2 | | 1/2008 | Dewey et al. |
| 2006/0144623 | A1 | | 7/2006 | Ollerensaw et al. |
| 2008/0115973 | A1 | | 5/2008 | Rives |
| 2011/0120777 | A1 | | 5/2011 | Lee |
| 2012/0298423 | A1 | | 11/2012 | Cruickshank et al. |

(Continued)

OTHER PUBLICATIONS

International Search Report issued in PCT/US2015/040381 dated Oct. 21, 2015, 4 pages.

(Continued)

*Primary Examiner* — David J Bagnell
*Assistant Examiner* — Kristyn A Hall

(57) ABSTRACT

An expandable tool includes a body and a recess extending at least partially through the body from an outer radial surface of the body. A spline insert may be at least partially positioned in the recess and coupled to the body. The spline insert may include a single spline or multiple splines. A cutter block or other expandable member may be at least partially positioned in the recess. The cutter block or other expandable member may include a spline on a side surface thereof, which spline may be engaged with the one or more splines of the spline insert. Engagement between one or more splines of the spline insert and spline of the cutter block or other expandable member may allow the expandable member to move radially outward from a retracted position to an expanded position, and vice versa.

13 Claims, 10 Drawing Sheets

(56) References Cited

U.S. PATENT DOCUMENTS

| | | |
|---|---|---|
| 2013/0048287 A1 | 2/2013 | Simson et al. |
| 2013/0264122 A1 | 10/2013 | Radford et al. |
| 2014/0182940 A1 | 7/2014 | Mahajan et al. |
| 2015/0184462 A1 | 7/2015 | Mahajan et al. |

OTHER PUBLICATIONS

International Preliminary Report on Patentability issued in International Patent Application No. PCT/US2015/040381, dated Jan. 26, 2017, 11 pages.

* cited by examiner

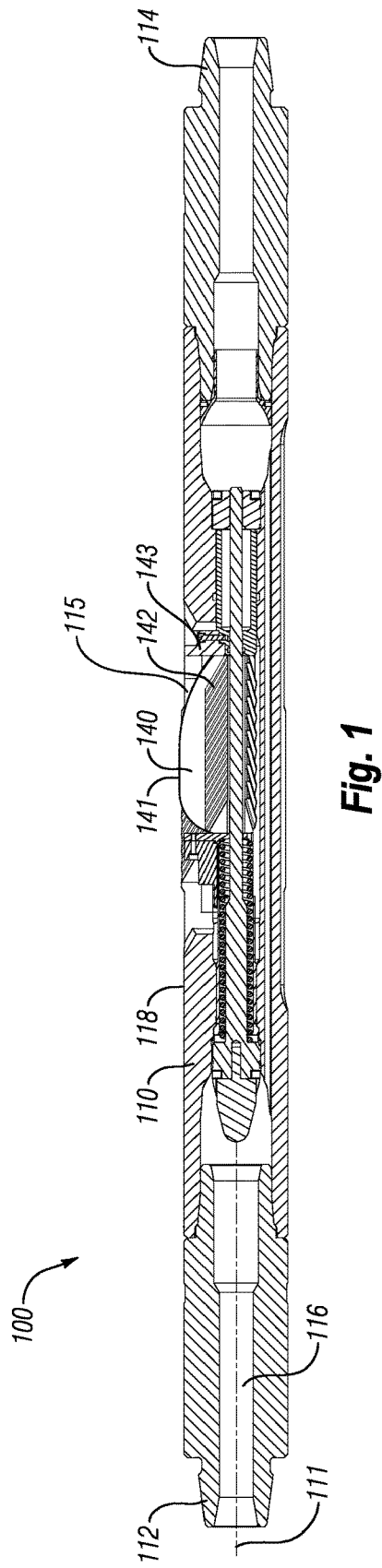
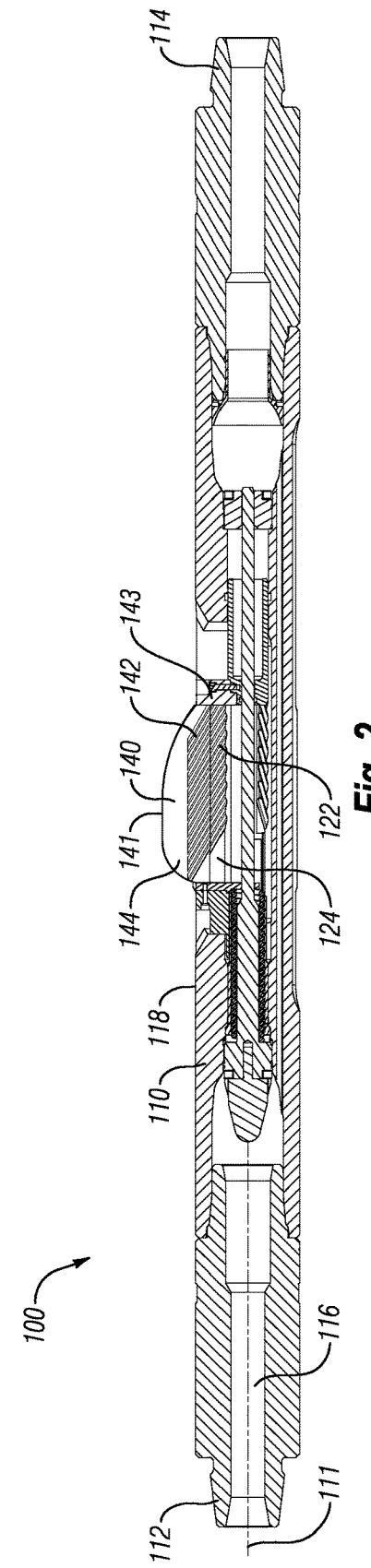

SPLINE INSERT FOR A DOWNHOLE TOOL

CROSS-REFERENCE TO RELATED APPLICATIONS

This application claims the benefit of, and priority to, U.S. Patent Application Ser. No. 62/024,678, filed Jul. 15, 2014, and titled "Spline Insert for a Downhole Tool," which application is expressly incorporated herein by this reference in its entirety.

BACKGROUND

In forming a wellbore for oil and gas exploration and production, a pilot wellbore is formed. The pilot wellbore may extend about vertically into the surrounding formation and may be cased, uncased, or have portions that are cased and other portions that are uncased. After forming the wellbore, a portion of the wellbore may thereafter be widened. For instance, the wellbore may be widened to accommodate larger sizes of casing. The process for widening the wellbore may include using an underreamer to expand the diameter of the wellbore.

An underreamer includes a cylindrical body and multiple cutter blocks that can move and expand relative to the cylindrical body. The cutter blocks move between a retracted position and an expanded position. In the retracted position, the cutter blocks are folded into corresponding recesses in the cylindrical body. In the retracted position, the cutter blocks and the cylindrical body can be run into the wellbore and lowered to a position where the wellbore is to be widened. When the underreamer is in a desired position in the wellbore, hydraulic fluid can be pumped into a drill string coupled to the underreamer. Through hydraulic pressure, the cutter blocks can be actuated and move radially outward relative to the cylindrical body. The cutter blocks move radially outward to contact the wall around the wellbore. By rotating the underreamer in the wellbore, the cutter blocks can cut into the wall of the wellbore and increase the diameter of the wellbore. The underreamer can also be moved axially while the cutter blocks are in the expanded position to expand the diameter of the wellbore along an axial portion of the wellbore.

SUMMARY

In accordance with some embodiments of the present disclosure, a downhole tool is disclosed. The downhole tool may include a body having an outer radial surface and an inner side surface. A recess may be defined in the outer radial surface at least partially by the inner side surface. An insert may be at least partially positioned in the recess and coupled to the body. The insert may include a spline. A cutter block may be at least partially positioned in the recess. The cutter block may include a spline on a side surface thereof that is engaged with the spline of the insert, and the cutter block may move radially outward from a retracted position to an expanded position.

A method for repairing a downhole tool is also disclosed. The method may include removing a first insert from a body of the downhole tool. The first insert may be positioned at least partially in a recess in the body prior to being removed. A second insert may be inserted at least partially into the recess in the body to replace the first insert. The first and second inserts may each include a spline, and the spline of the second insert may be engaged with a spline of a cutter block that is at least partially positioned in the recess. The cutter block may move radially outward from a retracted position to an expanded position.

A method for manufacturing a downhole tool is also disclosed. The method may include forming a plurality of splines on opposing inner side surfaces of a body. The inner side surfaces may at least partially define a recess in the body. A distance between a first opposing pair of the splines at a first radial position may be greater than a distance between a second opposing pair of the splines at a second radial position, and the second radial position may be farther from a longitudinal axis of the body than the first radial position. The splines on the body may be engaged with corresponding splines on opposing side surfaces of a cutter block. The cutter block may be at least partially positioned in the recess, and the cutter block may move radially outward from a retracted position to an expanded position.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

So that the aspects of the present disclosure may be understood in detail, a more particular description may be had by reference to one or more embodiments, some of which are illustrated in the appended drawings. It is to be noted, however, that the appended drawings are illustrative embodiments, and are, therefore, not to be considered limiting of the scope of the present disclosure.

FIG. 1 is a cross-sectional view of an expandable tool with cutter blocks in a retracted position, according to one or more embodiments of the present disclosure.

FIG. 2 is a cross-sectional view of the expandable tool of FIG. 1 with the cutter blocks in an expanded position, according to one or more embodiments of the present disclosure.

DETAILED DESCRIPTION

Figure 3:
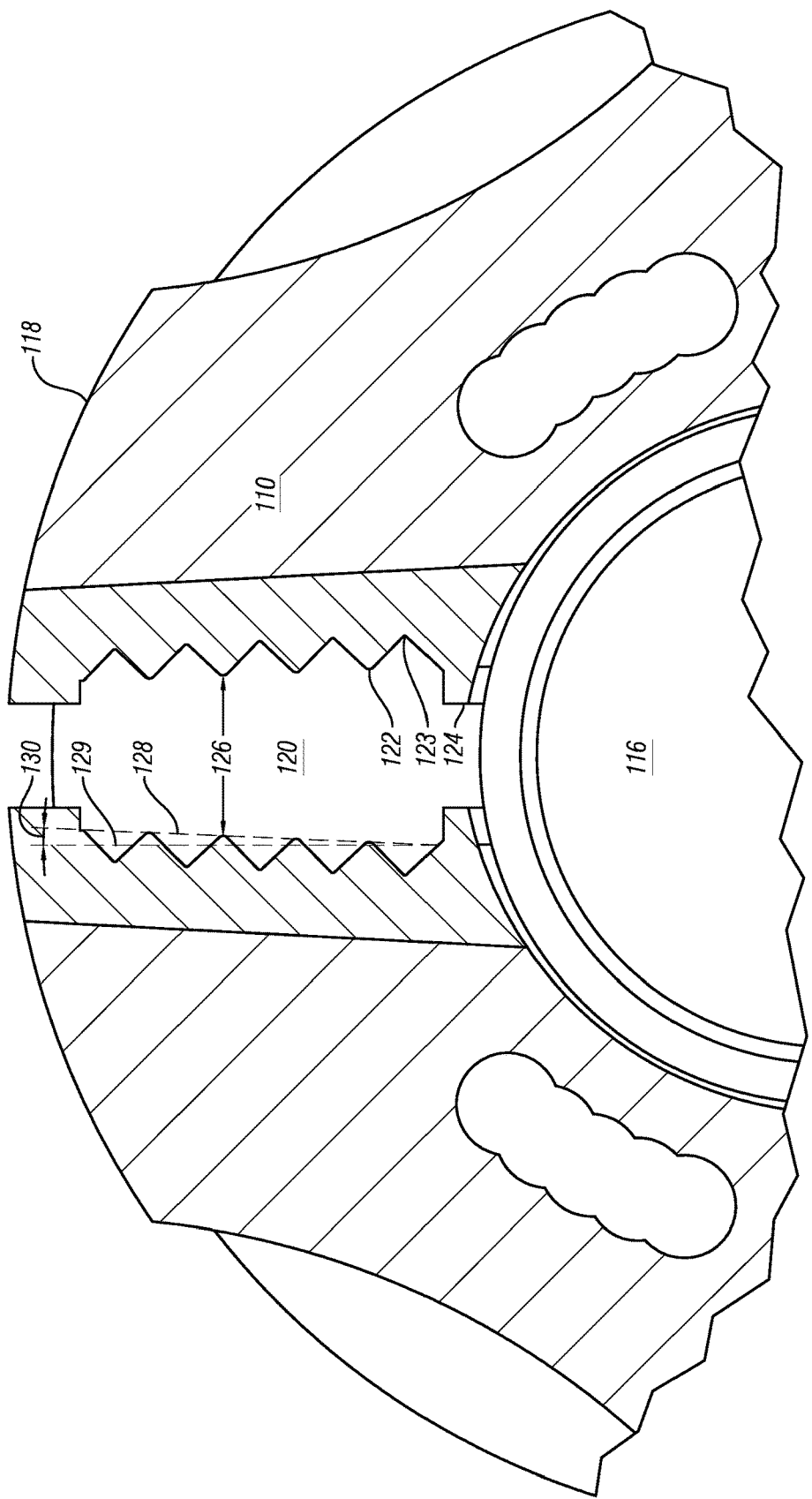
FIG. 3 is a cross-sectional view of splines on a body of the expandable tool of FIG. 1, according to one or more embodiments of the present disclosure.

Some embodiments described herein generally relate to modular tools. For instance, some embodiments of the present disclosure relate to expandable tools. More particularly, some embodiments relate to a downhole tool having modular, replaceable inserts for facilitating a splined engagement between a body of the downhole tool and expandable members that move along the splines. Example replaceable inserts may include one or more splines. In some embodiments, expandable members that engage the splines may include anchor slips, reamer cutter blocks, milling blades, expandable stabilizers, other tools, or combinations of the foregoing.

FIG. 1 is a cross-sectional view of an illustrative expandable tool 100 with expandable members in a retracted position, according to one or more embodiments of the present disclosure. In some embodiments, the expandable tool 100 may be a cutting tool such as an underreamer, and may be used in downhole reaming operations. Accordingly, the expandable members may include cutter blocks 140 used to ream, cut, mill, or otherwise deform a feature exterior to the expandable tool. In other embodiments, however, the expandable tool 100 may be or include any number of different types of tools. For instance, the size and/or configuration of the expandable tool 100 can be varied for use in medical reaming operations, manufacturing operations, or even downhole operations other than underreaming. For example, the expandable tool 100 may be used as a pipe cutter, a section mill, a bypass valve, an anchor (e.g., a whipstock anchor), an expandable stabilizer, a measuring-while-drilling ("MWD") tool, a logging-while-drilling ("LWD") tool, other expandable tools, or any combination of the foregoing. While expandable tools may be described herein with reference to cutter blocks (e.g., cutter blocks 140), such references should be interpreted broadly to include any number of different types of blades, knives, reaming blocks, anchor slips/grips, or other expandable tool, regardless of the structure, intended use, or industry of use.

The expandable tool 100 may include a body 110 having a first or "upper" end 112 and a second or "lower" end 114. A bore 116 may be formed and may extend axially through a partial or full length of the body 110. The body 110 may be a single component or two or more components coupled together. In some embodiments, the body 110 may be substantially cylindrical; however, the body 110 may have other configurations. For instance, the body 110 may have a circular, elliptical, hexagonal, octagonal, or other cross-sectional shape.

The expandable tool 100 may include one or more mechanical devices that are configured to be activated from a first position to a second position. As shown in FIG. 1, the mechanical devices may be or include expandable tools such as the cutter blocks 140 that are movably coupled to the body 110. For example, the body 110 may have three cutter blocks 140 that are circumferentially offset from one another. In other embodiments, there may be more (e.g., four, five, six, eight, etc.) or fewer (e.g., two) cutter blocks 140.

The cutter blocks 140 are shown in a first or retracted position in FIG. 1. When the cutter blocks 140 are in the retracted position, the cutter blocks 140 may be folded, recessed, or otherwise positioned in corresponding recesses 115 in the body 110. In at least one embodiment, when the cutter blocks 140 are in the retracted position, the outer radial surfaces 141 of the cutter blocks 140 may be aligned with, or positioned radially inward from, an outer radial surface 118 of the body 110. In another embodiment, when the cutter blocks 140 are in the retracted position, the outer radial surfaces 141 of the cutter blocks 140 may be positioned slightly radially outward from the outer radial surface 118 of the body 110. Such a position may be used, for instance, to stabilize the body 110 in a wellbore.

FIG. 2 is a cross-sectional view of the expandable tool 100 of FIG. 1 with the cutter blocks 140 in an expanded position, according to one or more embodiments of the present disclosure. The body 110 may have a plurality of splines 122 formed on one or more inner lateral or side surfaces 124 that define the recesses 115 (see FIG. 1) for the cutter blocks 140. In some embodiments, the cutter blocks 140 may have a corresponding plurality of splines 142 formed on lateral or side surfaces 144 of the cutter blocks 140. The splines 142 of the cutter blocks 140 may be engaged with the splines 122 of the body 110. During engagement, one or more of the splines 142 may contact one or more of the splines 122. Such engagement may continue as the cutter blocks 140 move relative to the body 110. The cutter blocks 140 may move (e.g., expand and retract) along a path generally defined by the splines 122, 142. The splines 142 on the cutter blocks 140 and the splines 122 of the body 110 may be oriented at an angle with respect to a central longitudinal axis 111 through the body 110. In some embodiments, the angle may be between 5° and 90°. More particularly, the angle between the splines 122 and/or splines 142 and the central longitudinal axis 111 may be within a range including lower and upper limits that include any of 5°, 10°, 15°, 20°, 25°, 30°, 45°, 60°, 75°, 90°, and any values therebetween. For instance, the angle may be between 15° and 25° or between 17° and 23°. In other embodiments, the angle may be less than 5° or greater than 90°.

The cutter blocks 140 may be activated from the retracted position to the expanded position when a piston 143 or other drive mechanism exerts a force on the cutter blocks 140 in a direction toward the first end 112 of the body 110 (e.g., to the left, as shown in FIG. 2). The engagement of the splines 142 of the cutter blocks 140 with the splines 122 of the body 110 may serve as a guided track that directs the movement of the cutter blocks 140 axially toward the first end 112 of the body 110 and radially outward. The movement in response to the force of the piston 143 may be at an angle similar to the angles for the splines 122, 142 as described herein. In other embodiments, the cutter blocks 140 may expand radially by translating at other angles, by pivoting, or by using a combination of translational and rotational movement.

When the cutter blocks 140 are in the expanded position, the outer radial surfaces 141 of the cutter blocks 140 may be positioned radially outward from the outer radial surface 118 of the body 110. An expanded radius may be the distance between the central longitudinal axis 111 of the body 110 and the outer radial surfaces 141 of the cutter blocks 140. A body radius may be a distance between the longitudinal axis 111 of the body 110 and the outer radial surface 118 of the body 110. In some embodiments, when the cutter blocks 140 are expanded, the expanded radius may be between 105% and 180% of the body radius. More particularly, the expanded radius may be within a range, relative to the body radius, that includes lower and/or upper limits including any of 105%, 110%, 115%, 120%, 125%, 130%, 140%, 150%, 160%, 175%, 180%, and any values therebetween. For instance, the expanded radius may be between 105% and 125%, or between 110% and 120% of the body radius. In other embodiments, the expanded radius may be less than 105% or more than 180% of the body radius.

The cutter blocks 140 may each have a plurality of cutting contacts or elements coupled to, or otherwise positioned on or near, the outer radial surface 141. The cutting elements of the cutter blocks 140 may be made from polycrystalline diamond compact ("PDC") material, ceramic or composite materials (e.g., tungsten carbide), cubic boron nitride, other so-called superhard or superabrasive materials, or any combination of the foregoing. The cutting elements on the cutter blocks 140 may cut, grind, shear, crush, or otherwise degrade the wall of the wellbore, thereby increasing the diameter of the wellbore when the cutter blocks 140 are in the expanded position. In some embodiments, each cutter block 140 may include one or more stabilizer pads on the outer radial surfaces 141 thereof. For instance, a stabilizer pad may be formed at a medial location along a length of the cutter block 140. In other embodiments, separate stabilizer pads may be formed at one or both ends of the cutter block 140, at an end and at a medial location, at multiple medial locations, or at some combination of the foregoing. In at least some embodiments, the stabilizer pad may be formed at a gauge location and may include gauge protection elements (not shown). Gauge protection elements may be formed of superhard or superabrasive materials (e.g., PDC, tungsten carbide, cubic boron nitride, etc.). In lieu of cutting, grinding, shearing, crushing, or otherwise degrading the wall of the wellbore, the gauge protection elements may provide wear resistance to limit wear of the outer surfaces 141 so as to maintain a gauge diameter/radius of the expandable tool 100.

FIG. 3 is a cross-sectional view of splines 122 on the body 110 of the expandable tool 100 of FIG. 1 with the cutter block 140 omitted for clarity, according to one or more embodiments of the present disclosure. As mentioned herein, the splines 122 may be integrally or otherwise formed on the inner lateral or side surfaces 124 of the body 110, and the side surfaces 124 may border or define the recess 120. In other embodiments, the splines 122 may be formed by one or more spline inserts coupled to the body 110. The splines 122 may be or include offset ridges, protrusions, or the like. Each adjacent pair of splines 122 may define a groove 123 therebetween. The splines 122 and grooves 123 may appear as alternating peaks and troughs, respectively. In some embodiments, each spline 122 may have the same shape, size, and other configuration, and each groove 123 may similarly have the same shape, size, and other configuration. In other embodiments, one or more of the splines 122 may have a different shape, size, or other configuration. Similarly, one or more of the grooves 123 may have a different shape, size, or other configuration.

Additionally, the side surfaces 124 may include any number of splines 122 and grooves 123 extending along the longitudinal length of the recess 120. For instance, there may be between one and twenty splines 122 and/or grooves 123 extending along the length of the side surfaces 124 in some embodiments. Depending on the angle, size, shape, and other configuration of the splines 122 and the grooves 123, the number of splines 122 and grooves 123 that appear in a cross-sectional view such as that in FIG. 3 may vary. For instance, in the cross-sectional view of FIG. 3, four splines 122 and five grooves 123 are shown. In other embodiments, however, there may be one, two, three, five, six, or more splines 122, or one, two, three, four, six, seven, or more grooves 123 visible in a corresponding cross-sectional view.

The splines 122 and the grooves 123 may be formed on one or both of the opposing lateral or side surfaces 124. Where formed on both side surfaces 124, a distance 126 may be defined as a lateral distance between peaks of splines 122 on opposing side surfaces 124. In some embodiments, the distance 126 may vary along a height of the recess 120. For instance, the distance 126 between a first opposing pair of the splines 122 at a first radial position (e.g., near the bottom of the recess 120 in FIG. 3) may be greater than the distance 126 between a second opposing pair of the splines 122 at a second radial position (e.g., near the top of the recess 120 in FIG. 3). In some embodiments, the second radial position may be farther from the longitudinal axis 111 (FIG. 1) of the body 110 than the first radial position. Said another way, a line 128 that is tangential to the tips of the splines 122 (or which passes through a midpoint or center of mass of each of the splines 122) may be oriented at an angle 130 with respect to an axis 129 that extends radially outward from, and perpendicular to, the longitudinal axis of the expandable tool 100. The angle 130 may be between 0.5° and 25° in some embodiments. For instance, the angle 130 may be between 0.5° and 20°, between 1° and 15°, or between 2° and 10°. In other embodiments, the angle 130 may be less than 0.5° or greater than 25°. In some embodiments, a tapered orientation may allow the splines 122 to be re-formed or machined, as discussed in greater detail with respect to FIG. 4.

Figure 4:
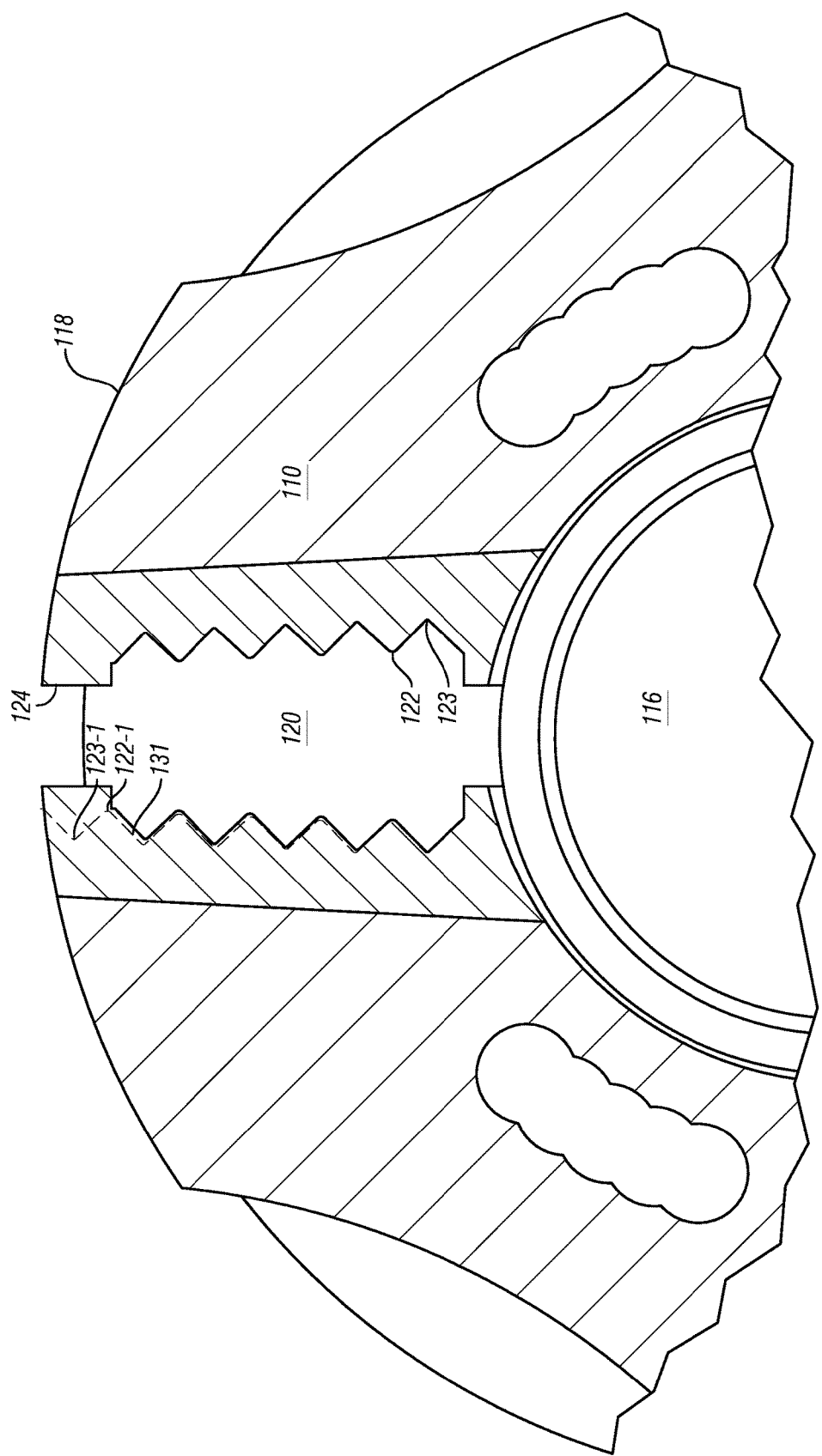
FIG. 4 is a cross-sectional view of the splines on the body of the expandable tool of FIG. 1, showing the formation of an additional spline, according to one or more embodiments of the present disclosure.

FIG. 4 is a cross-sectional view of the splines 122 on the body 110 of the expandable tool 100 of FIG. 1, and illustrates formation of an additional spline 122-1, according to one or more embodiments of the present disclosure. When a cutter block 140 (FIG. 1) is in an expanded position, the cutter block 140 may contact the wall of the wellbore to increase the diameter thereof. This contact may gradually wear down the cutter blocks 140, or portions thereof. More particularly, finite element analysis or downhole instrumentation may reveal that a large force is placed on the splines 142 (FIG. 1) on the cutter blocks 140 and the splines 122 on the body 110 when the cutter blocks 140 are in the expanded position and in contact with the surrounding formation. This force may cause one or more of the splines 142 on the cutter blocks 140 and/or the splines 122 on the body 110 to be at least partially damaged or deformed. In some embodiments, damage to the splines 122, 142 may lead to the expandable tool 100 being classified as "damaged beyond repair" even though other portions of the expandable tool 100 (e.g., the body 110) may be relatively undamaged.

In at least one embodiment, when the splines 142 are damaged, the cutter blocks 140 may be discarded. In another embodiment, the splines 142 of the cutter blocks 140 may be re-faced or otherwise repaired. Rather than discarding the body 110, one or more of the splines 122 on the body 110 (or on spline inserts) may be re-faced or otherwise repaired (e.g., by machining). For example, the splines 122 may be machined along the dashed line 131 to remove the damaged portion so that the surfaces of the splines 122 that contact the cutter block 140 are made of undamaged, "virgin" material. In some embodiments, the splines 122 and the body 110 may be formed of the same material (e.g., steel). In other embodiments, the splines 122 and the body 110 may be formed of different materials. For instance, the splines 122 may be formed of a material exhibiting higher wear resistance than a material used to form the body 110. As an example, the splines 122 (or any spline inserts) may be formed of tungsten carbide, while the body 110 is formed of steel.

In at least one embodiment, an additional spline 122-1 (and groove 123-1) may be formed in the inner side surfaces 124 of the body 110 defining the recess 120 after the expandable tool 100 has been used in a wellbore. The additional spline 122-1 is shown outlined by the dashed line 131. Although shown on one side surface 124, it will be appreciated that the additional spline 122-1 may be formed on each opposing side surface 124. The additional spline 122-1 may be positioned radially outward (e.g., near the top of the recess 120 of FIG. 4) from the original splines 122. The additional spline 122-1 may provide surfaces that are made of undamaged, virgin material to contact the cutter block 140 (FIG. 1). Once the additional spline 122 is formed, there may be one more splines 122, 122-1 on the body 110 than on the cutter block 140. In such an embodiment, the lower or innermost groove 123 in the body 110 may potentially be unused, and may not receive a spline 142 of the cutter block 140.

A method or process for forming new splines and/or re-facing existing splines may be performed on an expandable tool including splines integrally formed in the body of the expandable tool or in splines formed in a spline insert coupled to the body. Where new splines are formed, or existing splines are re-faced, on a spline insert, the process may further include removing the spline insert prior to forming or re-facing the splines. In other embodiments, however, the spline insert may remain coupled to the body of the expandable tool while forming or re-facing of a spline insert occurs.

Figure 5:
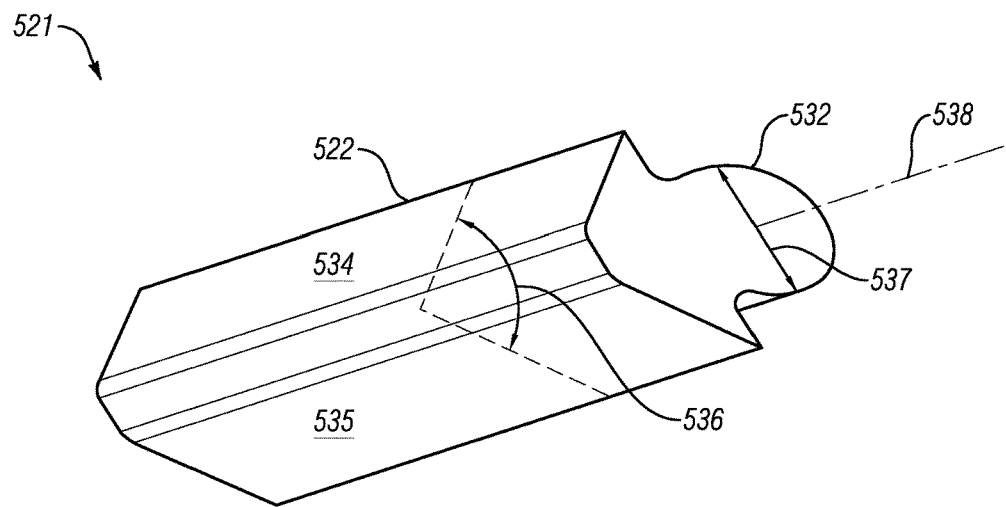
FIG. 5 is a perspective view of a spline insert, according to one or more embodiments of the present disclosure.

Rather than forming new splines, or rather than repairing or re-facing splines, some embodiments of the present disclosure contemplate fully replacing one or more splines using a spline insert having one or more splines thereon. FIG. 5, for instance, depicts a perspective view of a spline insert 521 having a single spline thereon, according to one or more embodiments of the present disclosure. The spline insert 521 may include a spline 522 and a base 532. The spline 522 may include first or "upper" surface 534 and a second or "lower" surface 535. The first and second surfaces 534, 535 may be outer surfaces for engaging corresponding splines of an expandable member (e.g., cutter block 640 of FIG. 6), and may be oriented at an angle 536 with respect to one another. In some embodiments, the angle 536 may be between 45° and 145°. For instance, the angle 536 may be between 45° and 135°, between 60° and 120°, or between 75° and 105°. In other embodiments, the angle 536 may be less than 45° or greater than 145°. In some embodiments, the first and second surfaces 534, 535 may be shaped and sized to contact or engage corresponding surfaces on the splines or grooves of the cutter block (see, e.g., FIG. 6).

The base 532 may be shaped and sized to be inserted into a corresponding slot in a body of an expandable tool to couple the spline insert 521 with the body. The thickness 537 of the base 532 may increase moving away from the spline 510 to form a "dovetail" shape. A dovetail or other similar shape may allow the base 532 to be coupled with the corresponding slot in the body via an interlocking connection. The particular shape of the base 532 may, however, vary in different embodiments. For instance, a cross-sectional shape of the base 532 may be a circle, oval, triangle, trapezoid, or the like, any of which may be used for forming a dovetail or other interlocking connection.

Figure 6:
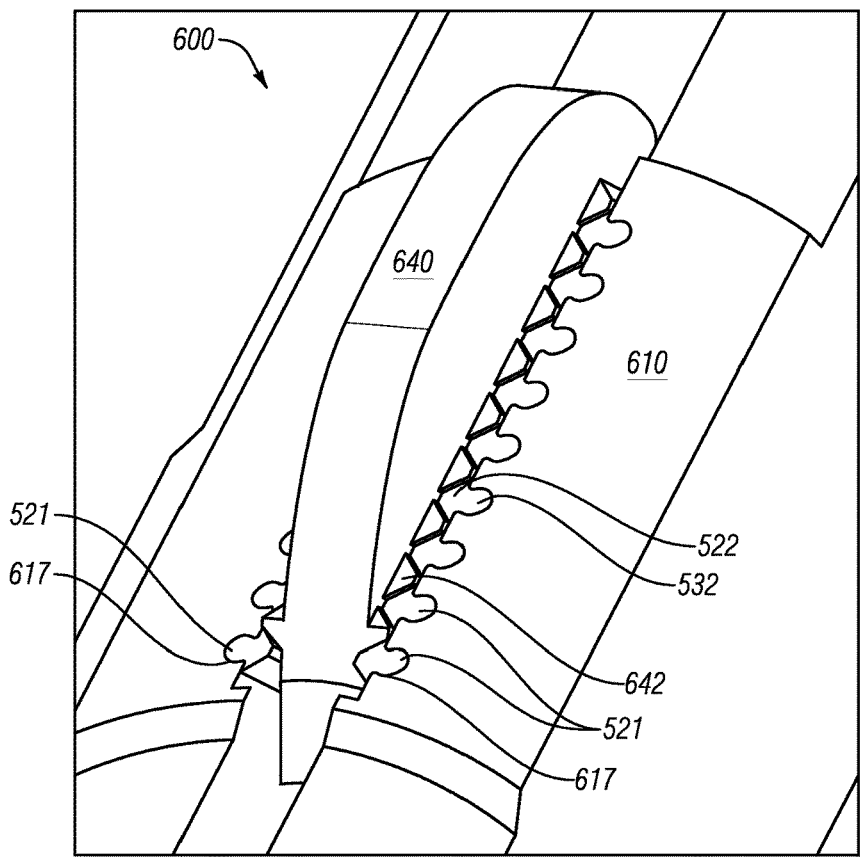
FIG. 6 is a partial perspective view of a modular tool including multiple instances of the spline insert of FIG. 5 in engagement with corresponding splines of a cutter block, according to one or more embodiments of the present disclosure.

FIG. 6 is a partial perspective view of an expandable tool 600 that includes a plurality of individual spline inserts 521 coupled to a body 610 and engaged with corresponding splines 642 of a cutter block 640, according to one or more embodiments of the present disclosure. The spline inserts 521 may each be inserted into a single one of various slots 617 in the body 610 of the expandable tool 600. The slots 617 may be oriented at an angle relative to a longitudinal axis of the body 610. Once the spline inserts 521 are inserted into the slots 617, a longitudinal axis 538 of the spline inserts 521 (see FIG. 5) may be oriented at a corresponding angle relative to the longitudinal axis of the body 610. For instance, the angle between the longitudinal axis 538 of the spline inserts 521 and a longitudinal axis of the body 610 may be between 5° and 90°. More particularly, the angle may be between 15° and 25°, between 10° and 30°, or between 5° and 45° with respect to the longitudinal axis of the body 610. In other embodiments, the angle may be less than 5°.

In some embodiments, and as shown in FIG. 6, adjacent spline inserts 521 may not be in contact with one another. In other embodiments, however, adjacent spline inserts 521 may be in contact with one another. Whether or not adjacent spline inserts 521 are in contact with one another, the area between the upper surface 534 (FIG. 5) one spline insert 521 and the lower surface 535 (FIG. 5) on an adjacent spline insert 521 may form a groove into which a spline 642 of the cutter block 640 may be positioned to engage the splines 522 of the spline inserts 521.

Nine parallel spline inserts 521 are shown in FIG. 6 as being coupled to the body 610 and positioned on and engaging each side of the cutter block 640; however, as will be appreciated by one of ordinary skill in the art having the benefit of this disclosure, the number may vary. For instance, more than nine or fewer than nine spline inserts 521 may be used. Further, instead of, or in addition to, the dovetail connection of the base 532, the spline inserts 521 may be coupled to the body 610 in other manners. For instance, the base 532 of the spline inserts 521 may be coupled to the body 610 with an adhesive (e.g., epoxy), a friction fit, mechanical fastener (e.g., a bolt, clamp, clasp, pin, etc.), welding, brazing, soldering, or the like.

During use of the expandable tool 600, one or more of the spline inserts 521 may become damaged. In some embodiments, the expandable tool 600 may be refurbished or otherwise repaired by removing the damaged or deformed spline inserts 521 from corresponding slots 617 in the body 610 and replacing the damaged spline inserts 521 with new spline inserts 521. Any undamaged or minimally damaged spline inserts 521 may remain coupled to the body 610 for continued use.

Figure 7:
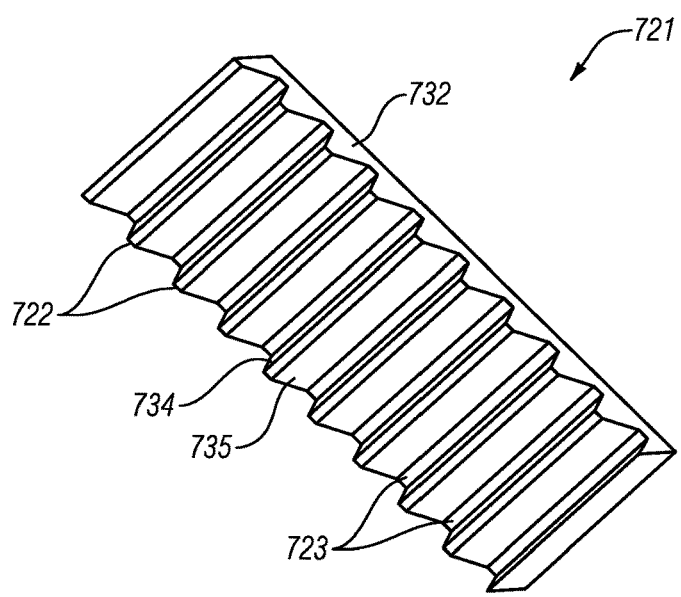
FIG. 7 is a perspective view of another spline insert, according to one or more embodiments of the present disclosure.

In addition to spline inserts that include a single, individual spline, other spline inserts may include a set of multiple splines. FIG. 7, for instance, is a perspective view of a spline insert 721, according to one or more embodiments of the present disclosure, and includes a plurality of individual splines 722 (and corresponding grooves 723) having a base 732. Each spline 722 may include first and second surfaces 734, 735, similar to the upper and lower surfaces 534, 535 of the spline 522 shown in FIG. 5. In lieu of each spline 722 being an individual spline with its own respective base, the splines 722 in the spline insert 721 of FIG. 7 may share the base 732, such that the base 732 may be common to multiple splines 722, or potentially each of the splines 722.

Figure 8:
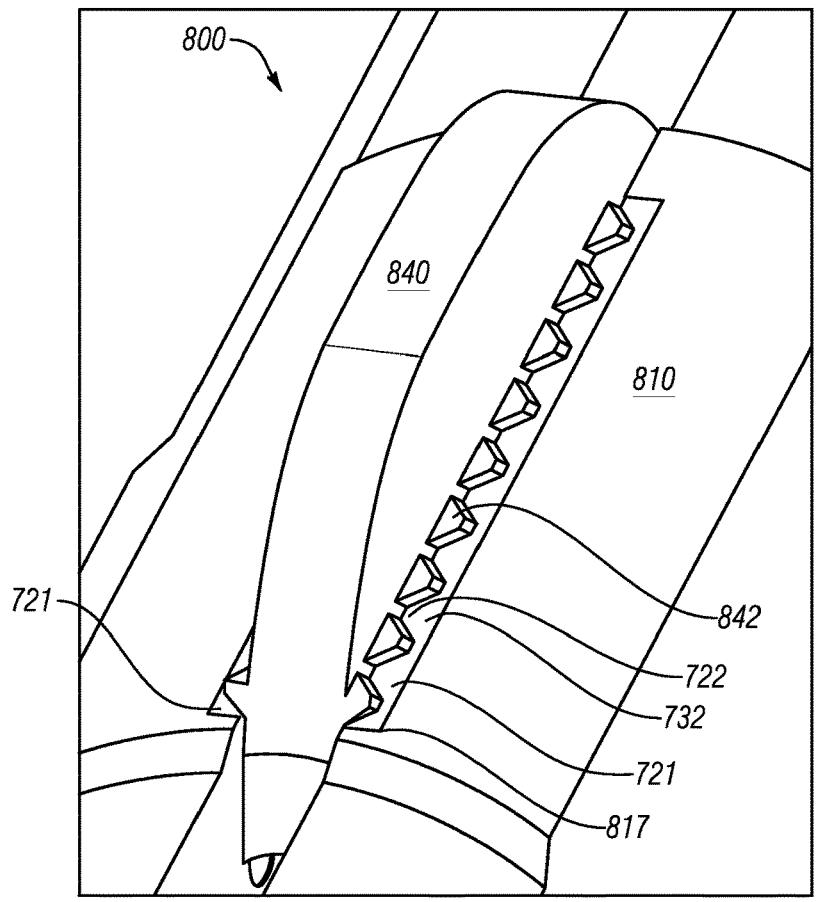
FIG. 8 is a partial perspective view of a modular tool showing the spline insert of FIG. 7 in engagement with corresponding splines of a cutter block, according to one or more embodiments of the present disclosure.

FIG. 8 is a partial perspective view of an expandable tool 800 showing the spline insert 721 of FIG. 7 coupled to a body 810 of the expandable tool 800 and engaged with corresponding splines 842 of a cutter block 840, according to one or more embodiments of the present disclosure. The spline insert 721 may be inserted into a corresponding slot 817 in the body 810 of the expandable tool 800. As shown, one spline insert 721 may be positioned on a first side of the cutter block 840, and another spline insert 721 may be positioned on a second or opposite side of the cutter block 840.

The spline insert 721 may be coupled with the body 810 with a dovetail connection, an adhesive (e.g., epoxy), a friction fit, mechanical fastener, welding, brazing, soldering, other attachment mechanisms, or any combination of the foregoing. After the expandable tool 800 has been used, if one or more of the splines 722 on the spline insert 721 is damaged or deformed, the spline insert 721 may be removed from the corresponding slot 817 in the body 810 and may be replaced with a new spline insert 721.

Figure 9:
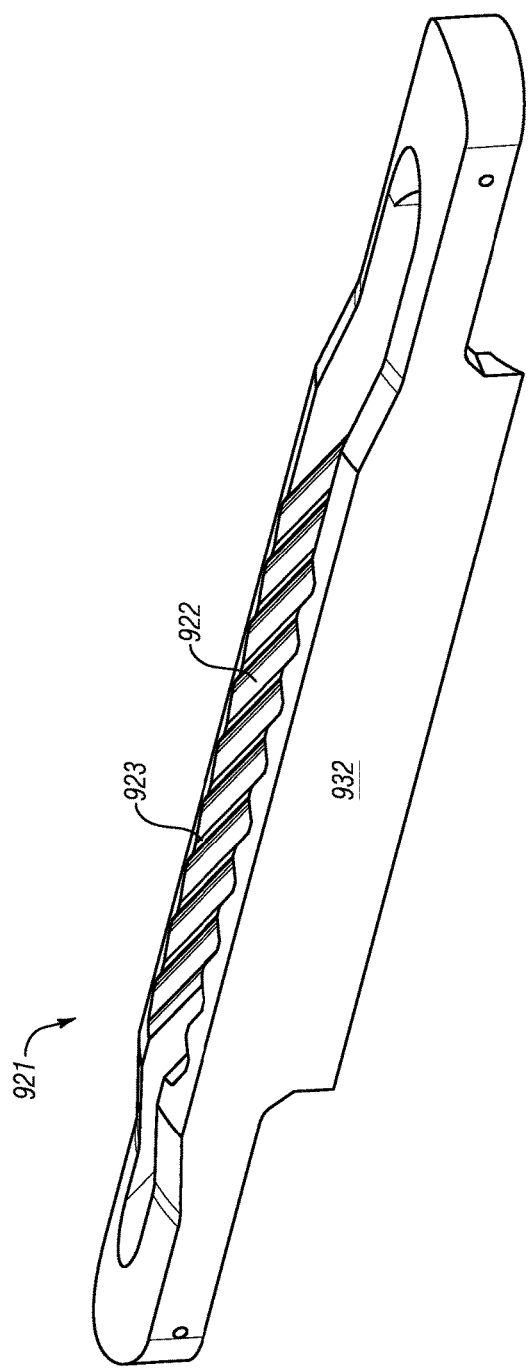
FIG. 9 is a perspective view of still another spline insert, according to one or more embodiments of the present disclosure.
Figure 10:
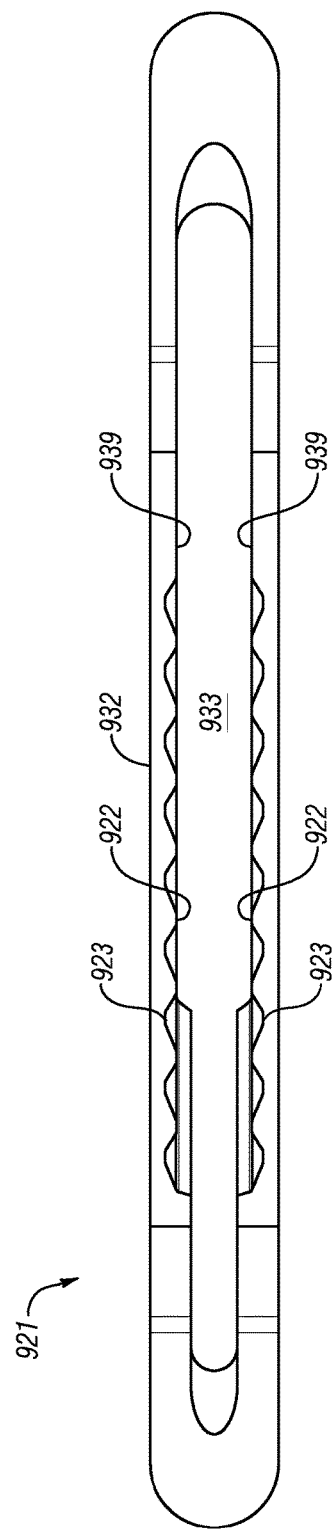
FIG. 10 is a top view of the spline insert of FIG. 9, according to one or more embodiments of the present disclosure.

FIGS. 9 and 10 are perspective and top views, respectively, of another spline insert 921, respectively, according to one or more embodiments of the present disclosure. The spline insert 921 of FIGS. 9 and 10 may be similar to the spline insert 721 of FIGS. 7 and 8 in that the spline insert 921 may include a plurality of splines 922 (and grooves 923) sharing a common base 932. Unlike the spline insert 721 of FIGS. 7 and 8, which may be positioned on a single side of a cutter block, the spline insert 921 of FIGS. 9 and 10 may include splines 922 configured to engage multiple sides of a cutter block 940 (e.g., both sides 144 of cutter block 140 of FIG. 2). More particularly, the base 932 of the spline insert 921 may include a slot, channel, or other opening 933 formed fully or partially therethrough. The opening 933 may be at least partially defined by opposing inner side surfaces 939 of the base 932. The splines 922 may be formed on the opposing inner lateral or side surfaces 939.

Figure 11:
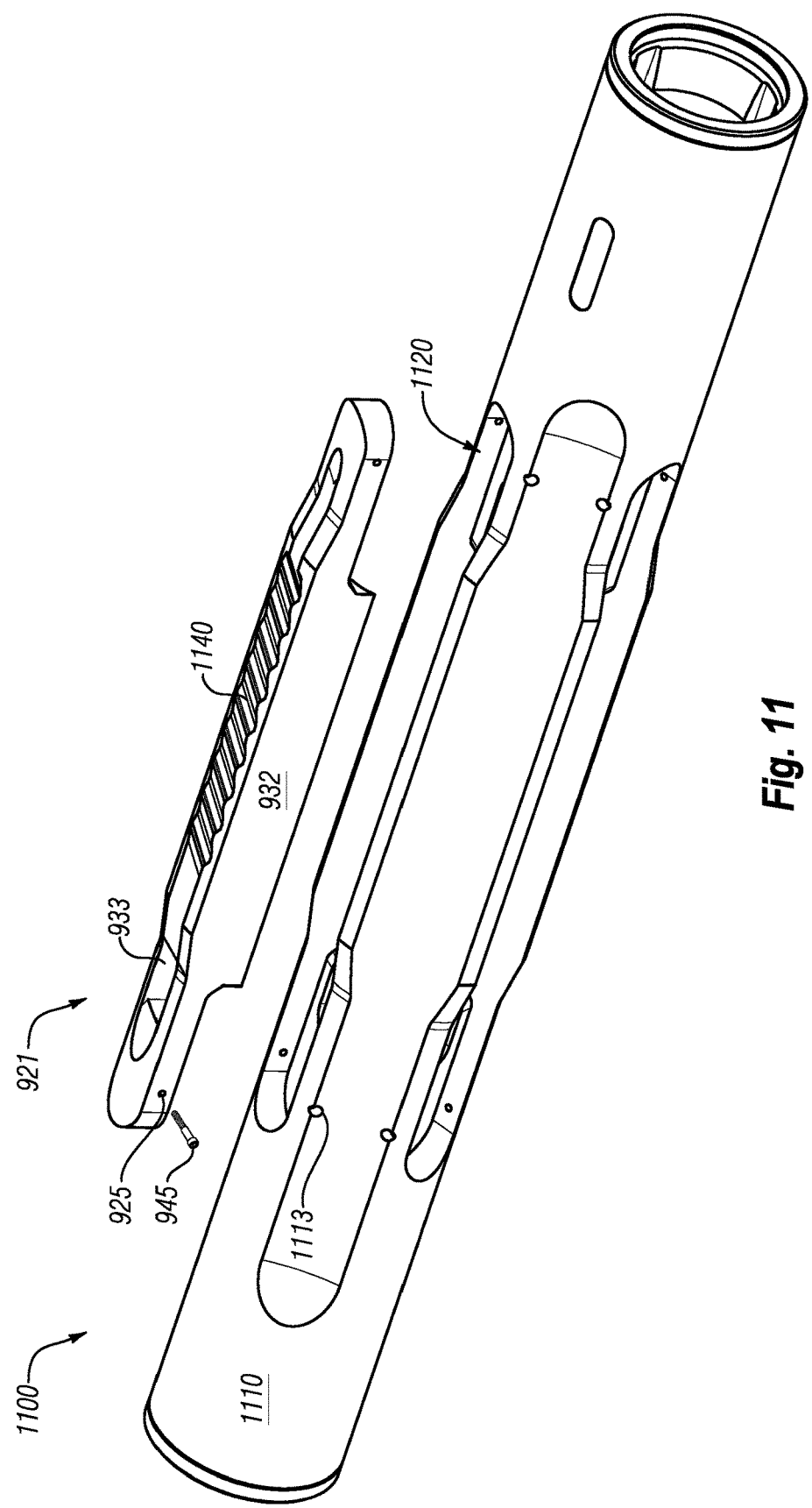
FIG. 11 is an exploded perspective view of the spline insert of FIGS. 9 and 10 for installation in a modular tool, according to one or more embodiments of the present disclosure.

FIG. 11 is a perspective view of the spline insert 921 of FIGS. 9 and 10 being installed in an expandable tool 1100, according to one or more embodiments of the present disclosure. The expandable tool 1100 may be a reamer, anchor, expandable stabilizer, milling tool, other downhole tool, or any combination of the foregoing. The spline insert 921 may be moved radially inward into a corresponding recess 1120 in a body 1110 of the expandable tool 1100. Once the spline insert 921 is in the recess 1120, an opening, slot, channel, aperture, or other bore 925 formed in the spline insert 921 may be aligned with a bore 1113 formed in the body 1110. A pin, bolt, or other mechanical connector 945 may be inserted through the bores 1113, 925 to couple the spline insert 921 to, and potentially within, the body 1110. In the same or other embodiments, the spline insert 921 may be coupled to the body 1110 using a dovetail connection, an adhesive, a friction fit, welding, brazing, soldering, other attachment mechanisms, or some combination of the foregoing.

A cutter block 1140 may be positioned at least partially within the opening 933 in the base 932 of the spline insert 921. Although not shown in FIG. 11, splines on the outer side surfaces of the cutter block 1140 may be engaged with the splines 922 (FIG. 10) on the inner side surfaces 939 of the spline insert 921.

Figure 12:
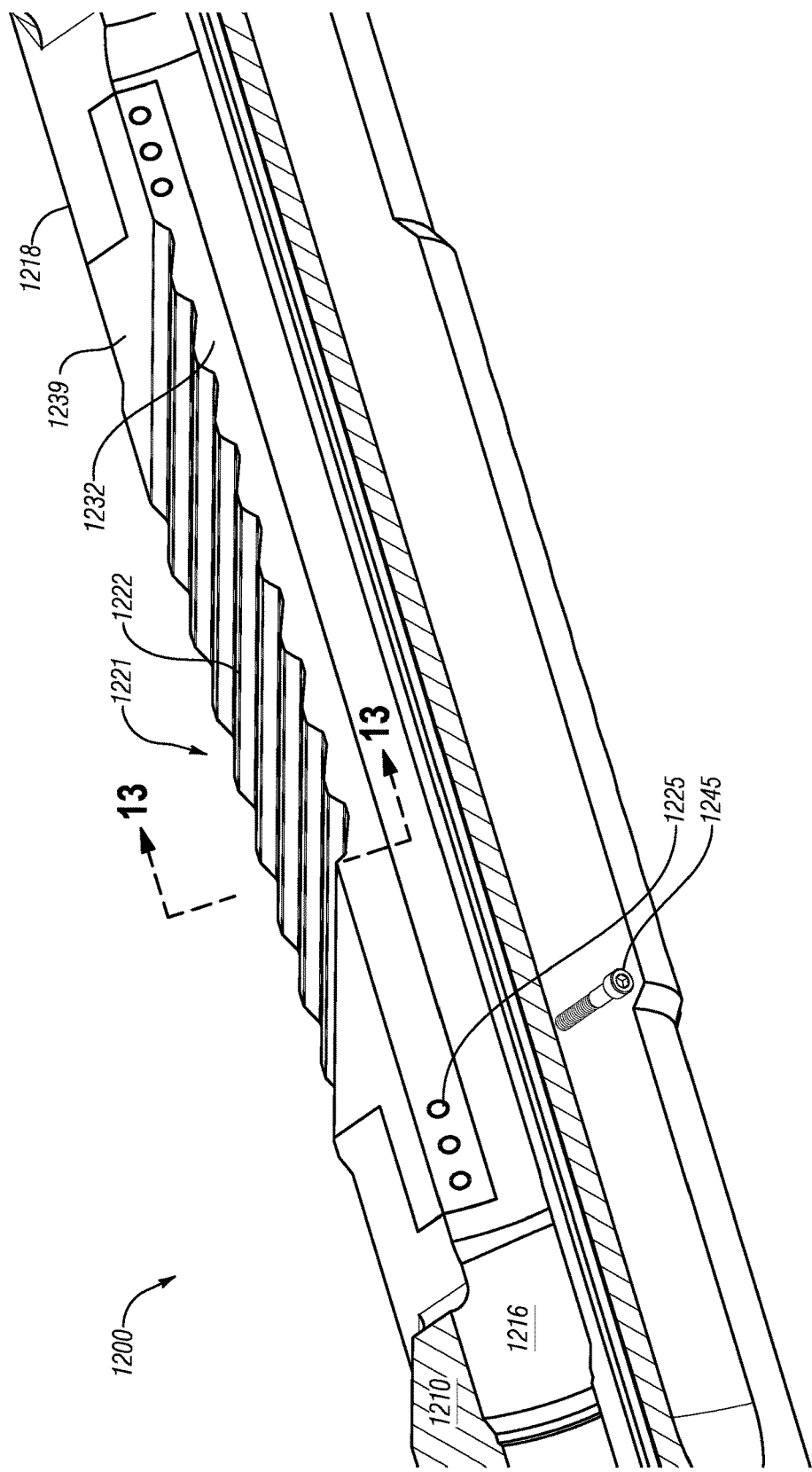
FIG. 12 is a partial cross-sectional, perspective view of a modular tool showing another spline insert coupled thereto, according to one or more embodiments of the present disclosure.

FIG. 12 is a partial cross-sectional, perspective view of an expandable tool 1200 showing another spline insert 1221 coupled to a body 1210 of the expandable tool 1200, according to another one or more embodiments of the present disclosure. The spline insert 1221 may include a base 1232 having a plurality of splines 1222 formed on an inner side surface 1239 thereof. The spline insert 1221 may be inserted into a recess 1220 in the body 1210 by moving the spline insert 1221 axially within a bore 1216 of the body 110 and then radially outward into the recess 1220. The spline insert 1221 may then be coupled to the body 1210 by any suitable attachment mechanism. For instance, a pin, bolt, or other mechanical fastener 1245 may be inserted through, threaded into, or may otherwise cooperate with a bore 1225 in the spline insert 1221 and a corresponding bore (not shown) in the body 1210. In the same or other embodiments, the spline insert 1221 may be coupled to the body 1210 using a dovetail connection, an adhesive, a friction fit, welding, brazing, soldering, or the like.

Figure 13:
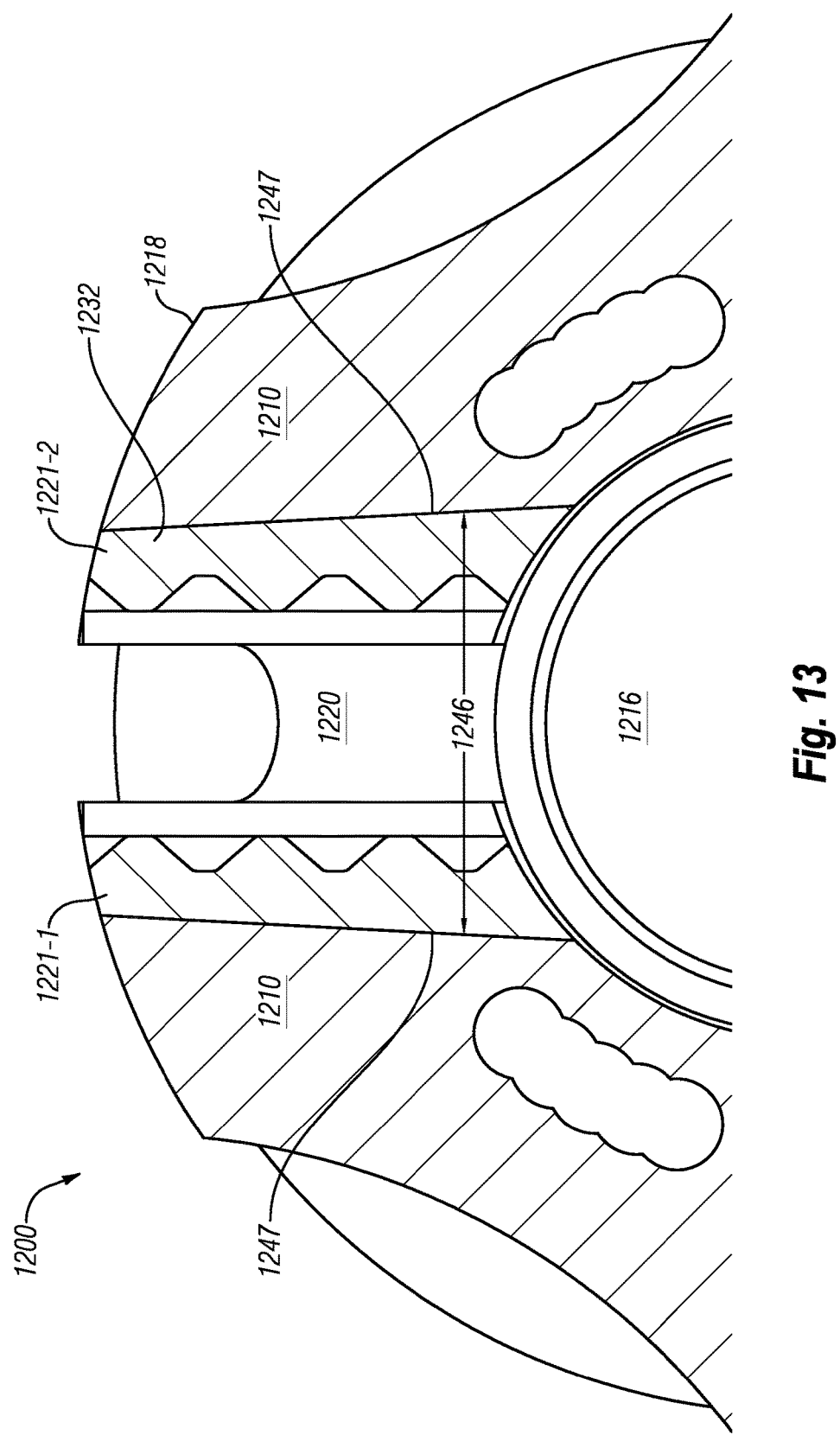
FIG. 13 is a cross-sectional view of a modular tool and the spline insert as taken along line 13-13 in FIG. 12, according to one or more embodiments of the present disclosure.

FIG. 13 is a cross-sectional view of the expandable tool 1200 and the spline insert 1221 taken along line 13-13 in FIG. 12, according to one or more embodiments of the present disclosure. A first spline insert 1221-1 may be positioned on and engage a first side of a cutter block (not shown in FIG. 13), and a second spline insert 1221-2 may be positioned on and engage a second side of the cutter block. In another embodiment, the first and second spline inserts 1200-1, 1200-2 may be coupled to each other and form a single spline insert (see spline insert 921 of FIG. 9).

In some embodiments, a distance 1246 between outer side surfaces 1247 (which may be bottom surfaces of a base 1232) of the two spline inserts 1221-1, 1221-2 may decrease as the radial distance from the spline inserts 1221-1, 1221-2 increases from a bore 1216 or central axis of the body 1210. The distance 1246 may therefore be greater proximate the bore 1216 than proximate an outer radial surface 1218 of the body 1210. In other words, a dovetail connection may be formed by the spline inserts 1221-1, 1221-2 and the body 1210. Such a connection may restrict, or even prevent, the spline inserts 1221-1, 1221-2 from moving radially outward beyond a predetermined position in the body 1210. The shape of the dovetail or other connection with the body 1210 may be varied. In FIG. 13, for instance, the spline inserts 1221-1, 1221-2 may form a linearly tapered connection. In other embodiments, a stepped tapered connection may be formed. In still other embodiments, a parabolic or otherwise curved tapered connection may be formed.

Figure 14:
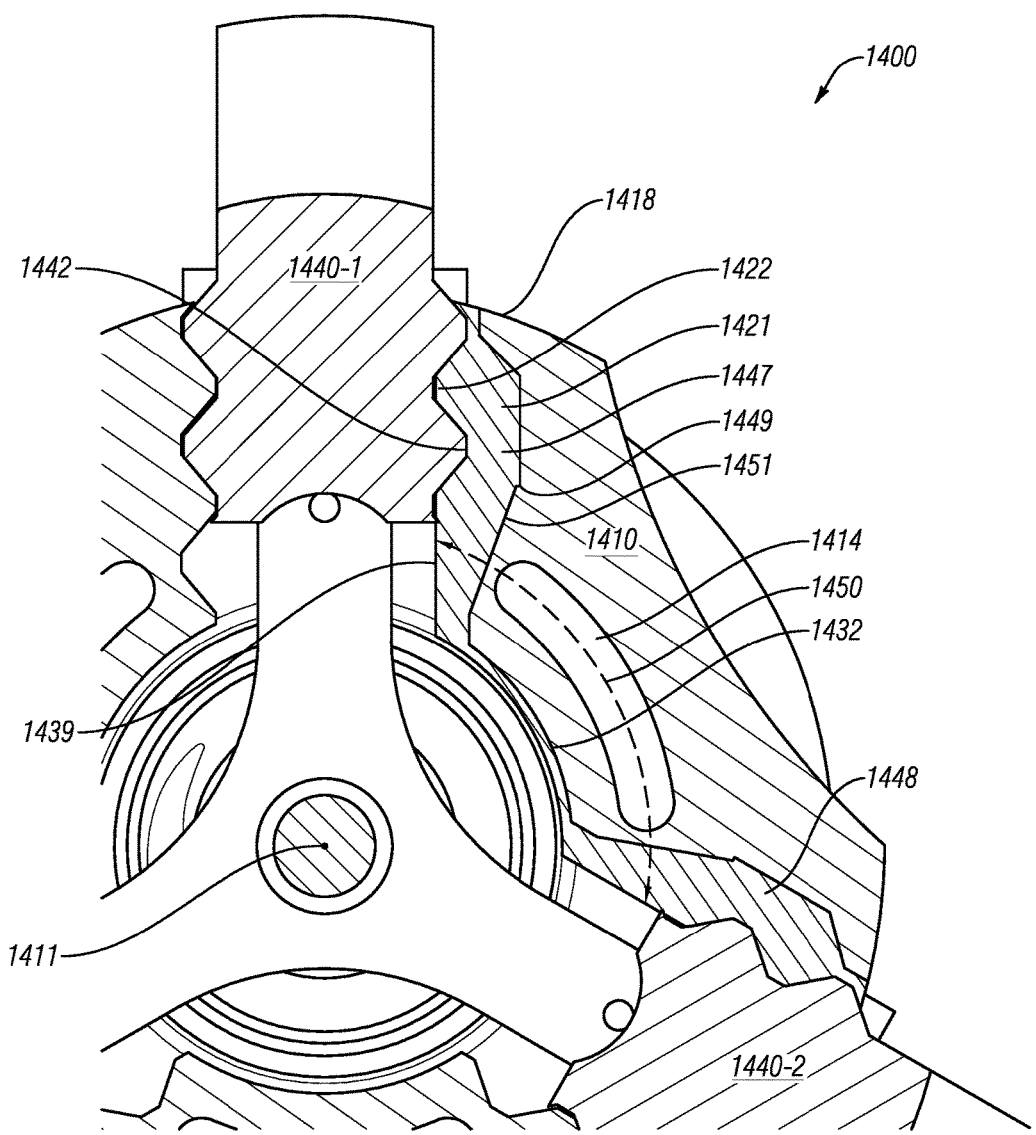
FIG. 14 is a partial cross-sectional view of a modular tool showing yet another spline insert coupled thereto, according to one or more embodiments of the present disclosure.

FIG. 14 is a cross-sectional view of an expandable tool 1400 having yet another spline insert 1421 coupled thereto, according to one or more embodiments of the present disclosure. The spline insert 1421 may include a base 1432 with two wings 1447, 1448 extending therefrom. The first wing 1447 may include a plurality of splines 1422 formed on an outer side surface 1439 thereof. The splines 1422 on the first wing 1447 may be configured to engage corresponding splines 1442 on a lateral or side surface of the first cutter block 1440-1. The second wing 1448 may also include a plurality of splines 1422 formed the outer side surface 1439 thereof. The splines 1422 on the second wing 1448 may be configured to engage corresponding splines 1442 on one or more lateral or side surfaces of the second cutter block 1440-2. An angle 1450 between the first and second wings 1447, 1448 (and between the first and second cutter blocks 1440-1, 1440-2) may, in some embodiments, be between 36° and 180°. For instance, the angle 1450 may be between 45° and 180°, between 60° and 135°, or between 90° and 120°. While the splines 1422 are shown positioned on lateral or side surfaces of the wings 1447, 1448 (to engage lateral or side surfaces of the cutter blocks 1440-1, 1440-2), in some embodiments, the splines may also (or instead) be positioned to engage a rear or back surface of the cutter blocks 1440-1, 1440-2.

The spline insert 1421 may be coupled to the body 1410 in any suitable manner. In some embodiments, the spline insert 1421 may be installed through a pocket in the body 1410. The spline insert 1421 may include one or more protrusions 1449 configured to engage a corresponding groove in the body 1410 to help secure the spline insert 1421-1, 1421-2 in place. As shown, the protrusions 1449 may be positioned on the inner side surfaces 1451 of the wings 1447, 1448.

When coupling the spline inserts 1421-1, 1421-2 to the body 1410, the corresponding base 1432 may be positioned radially between a longitudinal axis 1411 of the body 1410 and an outer radial surface 1418 of the body 1410. In at least one embodiment, a flow port 1414 may extend axially through at least a portion of the body 1410. The flow port 1414 may be positioned radially between the bases 1432 of the spline inserts 1421-1, 1431-2 and the outer radial surface 1418 of the body 1410. In some embodiments, the flow port 1414 may be positioned circumferentially between the first and second wings 1447, 1448.

As discussed herein, embodiments of the present disclosure may include expandable tools, modular tools, assemblies and components of expandable or modular tools, downhole tools and assemblies thereof, methods and processes for removing and replacing spline inserts of an expandable tool, and the like. In such embodiments, the expandable tool may be modular so as to allow any number of different spline inserts to be coupled to the tool. Such spline inserts may be coupled to the expandable tool and, when damaged or worn, the spline inserts may be removed and replaced with other modular spline inserts. An expandable tool may therefore continue to be used even after damage to one or more splines as a result of the spines being removable and modular, rather than integrally formed therewith. In other embodiments, integral splines may be machined to continue use of the expandable tool. In still other embodiments, integral splines may be removed through a machining or other process to retrofit an expandable tool for use with modular spline inserts.

Relational terms such as "bottom," "below," "top," "above," "back," "front," "left," "right," "rear," "forward," "up," "down," "inner," "outer," "clockwise," "counterclockwise," "upper," "lower," "uphole," "downhole," and the like, may be used to describe various components, including their operation and/or illustrated position relative to one or more other components. Relational terms do not indicate a particular orientation for each embodiment within the scope of the description or claims. For example, a component of a downhole tool that is described as "below" another component may be further from the surface while within a vertical wellbore, but may have a different orientation during assembly, when removed from the wellbore, or in a lateral or deviated borehole. Accordingly, relational descriptions are intended solely for convenience in facilitating reference to various components, but such relational aspects may be reversed, flipped, rotated, moved in space, placed in a diagonal orientation or position, placed horizontally, placed vertically, or similarly modified. Certain descriptions or designations of components as "first," "second," "third," and the like may also be used to differentiate between identical components or between components that are similar in use, structure, or operation. Such language is not intended to limit a component to a singular designation. As such, a component referenced in the specification as the "first" component may be the same as, or different from, a component that is referenced in the claims as a "first" component.

Furthermore, while the description or claims may refer to "an additional" or "other" element, feature, aspect, component, or the like, it does not preclude there being a single element, or more than one, of the additional element. Where the claims or description refer to "a," "an," or "the" element, such reference is not be construed that there is just one of that element, but is instead to be inclusive of other components and understood as "at least one" of the element. It is to be understood that where the specification states that a component, feature, structure, function, or characteristic "may," "might," "can," or "could" be included, that particular component, feature, structure, or characteristic is provided in some embodiments, but is optional for other embodiments of the present disclosure. The terms "couple," "coupled," "connect," "connection," "connected," "in connection with," and "connecting" refer to "in direct connection with," or "in connection with via one or more intermediate elements or members." Components that are "integral" or "integrally" formed include components made from the same piece of material, or sets of materials, such as by being commonly molded or cast from the same material, or commonly machined from the same piece of material stock. Components that are "integral" should also be understood to be "coupled" to each other.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination.

A person having ordinary skill in the art should realize with the benefit of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

While embodiments disclosed herein may be used in oil, gas, or other hydrocarbon exploration or production environments, such environments are merely illustrative. Systems, tools, assemblies, methods, milling systems, and other components of the present disclosure, or which would be appreciated in view of the disclosure herein, may be used in other applications and environments. In other embodiments, underreamers, anchors, milling tools, expandable tools, modular tools, or other components or assemblies of the present disclosure may be used outside of a downhole environment, including in connection with other systems, including within automotive, aquatic, aerospace, hydroelectric, manufacturing, medical, other industries, or even in other downhole environments. The terms "well," "wellbore," "borehole," and the like are therefore also not intended to limit embodiments of the present disclosure to a particular industry. A wellbore or borehole may, for instance, be used for oil and gas production and exploration, water production and exploration, mining, utility line placement, or myriad other applications.

Certain embodiments and features may be described herein using a set of numerical values. Where upper and/or lower limits are included, it should be appreciated that ranges including the combination of any two values are contemplated unless otherwise indicated, that a range may include any value up to a specified value, a range may include any value above a specified value, or even a particular value may be defined as any specified value or value within a given range. Numbers, percentages, ratios, measurements, or other values stated in the description and claims are intended to include the stated value as well as other values that are about or approximately the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least experimental error and variations that would be expected by a person having ordinary skill in the art, as well as the variation to be expected in a suitable manufacturing or production process. A value that is about or approximately the stated value and is therefore encompassed by a stated value may further include values that are within 5%, within 1%, within 0.1%, or within 0.01% of a stated value.

The Abstract at the end of this disclosure is provided to allow the reader to ascertain the general nature of some embodiments of the present disclosure. It is submitted with the understanding that it will not be used to interpret or limit the scope or meaning of the claims.

What is claimed is:

1. An expandable tool, comprising:
a body having a recess therein;
a spline insert coupled to the body adjacent or at least partially within the recess, the spline insert including at least one spline, the spline insert further including first and second wings circumferentially offset from one another with respect to a longitudinal axis of the body, the at least one spline of the spline insert including:
a first spline on the first wing; and
a second spline on the second wing;
a first expandable member at least partially positioned in the recess and configured to move radially between a retracted position and an expanded position, the first expandable member including a spline on a side surface, the spline of the first expandable member being engaged with the first spline on the first wing of the spline insert to facilitate radial movement of the expandable member relative to the body; and
a second expandable member having a spline engaged with the second spline on the second wing of the spline insert.

2. The expandable tool of claim 1, the spline insert including at least two separate spline inserts engaged with the spline of the first expandable member.

3. The expandable tool of claim 1, the spline insert including at least two splines sharing a common base.

4. The expandable tool of claim 1, the spline insert being configured to be removed from the body and replaced with another spline insert.

5. A method, comprising:
removing a first spline insert from within a recess in a body of a downhole tool having at least two expandable members configured to expand radially between retracted and expanded positions, the first spline insert including first and second wings circumferentially offset from one another with respect to a longitudinal axis of the downhole tool, the first spline insert including a first spline on the first wing engaged with a first one of the at least two expandable members a second spline on the second wing engaged with a second one of the at least two expandable members; and
inserting a second spline insert at least partially into the recess in the body, the second spline insert including at least one spline configured to engage the first one of the at least two expandable members.

6. The method of claim 5, further comprising:
engaging the at least one spline of the second spline insert with a spline of the second one of the at least two expandable members.

7. The method of claim 5, wherein inserting the second spline insert at least partially into the recess in the body further includes coupling a base of the second spline insert to the body using an interlocking connection or a mechanical fastener.

8. The method of claim 5, further comprising at least one of:
re-facing at least a portion of a first surface of the at least one spline of the second spline insert after the at least one spline of the second spline insert is damaged, thereby forming a new, undamaged spline surface; or
forming an additional spline on each of opposing inner side surfaces of the second spline insert after the downhole tool has been used in a wellbore.

9. A downhole tool, comprising:
a body having a recess formed in an outer surface thereof;
at least two cutter blocks within the recess in the body, each of the at least two cutter blocks including at least one spline configured to be used to radially expand and retract the at least two cutter blocks relative to the body; and
at least one spline insert replaceably coupled to the body, the at least one spline insert engaging at least one spline of each of the at least two cutter blocks, the at least one spline insert including first and second wings circumferentially offset from one another with respect to a longitudinal axis of the body, the at least one spline including:
a first spline on the first wing engaged with the at least one spline of a first cutter block of the at least two cutter blocks; and
a second spline of the second wing engaged with the at least one spline of a second cutter block of the at least two cutter blocks.

10. The downhole tool of claim 9, the at least one spline insert including a plurality of splines coupled to a common base.

11. The downhole tool of claim 9, the body including a slot configured to receive the at least one spline insert therein.

12. The downhole tool of claim 9, the at least one spline insert engaging at least one spline on a single side surface of the first cutter block.

13. The downhole tool of claim 9, the at least one spline insert including a plurality of splines having first and second outer surfaces oriented at an angle between 45° and 135° relative to one another.

* * * * *